United States Patent
Yeh et al.

(10) Patent No.: US 8,092,065 B2
(45) Date of Patent: Jan. 10, 2012

(54) MULTI-FUNCTION PLANAR LIGHT SOURCE ILLUMINATION LAMP

(75) Inventors: Mau-Shiun Yeh, Chiayi (TW); Yung-Fang Chou, Taoyuan (TW); Fu-Sheng Sung, Zhudong Township, Hsinchu County (TW)

(73) Assignee: Chung-Shan Institute of Science and Technology Armaments Bureau, Ministry of National Defense, Taoyuan County (TW)

( * ) Notice: Subject to any disclaimer, the term of this patent is extended or adjusted under 35 U.S.C. 154(b) by 410 days.

(21) Appl. No.: 12/534,102

(22) Filed: Jul. 31, 2009

(65) Prior Publication Data

US 2011/0025229 A1    Feb. 3, 2011

(51) Int. Cl.
*F21V 7/04* (2006.01)

(52) U.S. Cl. ........ 362/613; 362/603; 362/612; 362/619; 362/625

(58) Field of Classification Search ................ 362/613, 362/612, 614, 602–605, 619, 625, 615, 630, 362/631, 230, 231, 800

See application file for complete search history.

(56) References Cited

U.S. PATENT DOCUMENTS

| | | | | |
|---|---|---|---|---|
| 7,172,327 B2* | 2/2007 | Kuo | | 362/609 |
| 7,377,681 B2* | 5/2008 | Park | | 362/613 |
| 7,540,628 B2* | 6/2009 | Awai et al. | | 362/227 |
| 7,794,111 B2* | 9/2010 | Huang et al. | | 362/246 |
| 2006/0098453 A1* | 5/2006 | Kuo | | 362/609 |
| 2006/0146570 A1* | 7/2006 | Park | | 362/613 |
| 2006/0245209 A1* | 11/2006 | Jeong et al. | | 362/612 |
| 2007/0002579 A1* | 1/2007 | Lee et al. | | 362/561 |
| 2007/0247873 A1* | 10/2007 | Awai et al. | | 362/618 |

* cited by examiner

*Primary Examiner* — Bao Q Truong (57) ABSTRACT

The invention discloses a multi-function planar light source illumination lamp having a containing space and comprising a first lighting unit, a second lighting unit, a light guide unit and a control unit. The first lighting unit is used for generating a first light source arranged as a linear element. The second lighting unit is used for generating a second light source arranged as a punctual array. The light guide unit, disposed in the containing space, is used for providing the multi-function planar light source illumination lamp to generate a homogeneous planar light source. The control unit generates a control signal for controlling the first lighting unit and the second lighting unit to generate a luminous flux of the first light source and the second light source.

20 Claims, 9 Drawing Sheets

MULTI-FUNCTION PLANAR LIGHT SOURCE ILLUMINATION LAMP

BACKGROUND OF THE INVENTION

1. Field of the Invention

The present invention relates to a multi-function planar light source illumination lamp which has a first light source and a second light source. More particularly, the first light source can be used alone to provide general illumination; the second light source can be used alone to provide adjustable mood illumination; or the first light source and the second light source can be used simultaneously to adjust optical intensity, color temperature and color gentleness of the general illumination.

2. Description of the Prior Art

A traditional illumination lamp uses a fluorescence tube or a light bulb as the light source which has the problems of generating glare and non-uniform illumination. At present, white Light Emitting Diode (LED) is already used as the light source. However, the high power LED is easy to have heat-dissipating problem to cause a drop of the optical efficiency. A linear white tube (for example, Cold Cathode Fluorescent Lamp (CCFL) and Hot Cathode Fluorescent Lamp (HCFL)) has higher optical efficiency, but its color rendering property is worse then LED.

In view of said shortcomings of the traditional illumination lamp, the invention provides a multi-function planar light source illumination lamp to solve said problems. The multi-function planar light source illumination lamp of the invention uses the linear white-light lighting element as the light source of the general illumination because of its advantage of high optical efficiency. Moreover, the multi-function planar light source illumination lamp uses LEDs with the primary colors (red, green and blue) to be the light source of adjustable mood illumination because of its advantage of high color rendering property. Additionally, these two lighting elements can be used simultaneously to improve the color temperature and the color gentleness of the white-light lighting elements.

In view of said shortcomings of the prior art, the invention provides a multi-function planar light source illumination lamp to solve said problems, and more particularly, to adjust the color temperature and increase the color gentleness of the white-light lighting element.

SUMMARY OF THE INVENTION

Accordingly, an aspect of the present invention is to provide a multi-function planar light source illumination lamp which has a containing space and comprises a first lighting unit, a second lighting unit, a light guide unit and a control unit.

The first lighting unit is used for generating a first light source arranged as a linear element. The second lighting unit is used for generating a second light source arranged as a punctual array. The light guide unit is disposed in the containing space and is used for providing the illumination lamp to generate a homogeneous planar light source. The control unit generates a control signal for controlling the first lighting unit and the second lighting unit to generate a luminous flux of the first light source and the second light source.

Moreover, the light guide unit further comprises an exit surface, a reflective layer and a plurality of surface microstructures. The exit surface is used for outputting the planar light source. The plurality of reflective structures, disposed in the reflective layer, are used for reflecting the first light source and the second light source to the exit surface. Additionally, the first light source and the second light source change an angle of reflection according to the plurality of surface microstructures, and selectively generate a light intensity distribution outside of the illumination lamp according to the light guide unit.

Another aspect of the present invention is to provide an illumination lamp body which has a containing space and comprises a first lighting unit, a second lighting unit, a light guide unit, a light adjustment unit, a reflection unit and a control unit.

The first lighting unit is used for generating a first light source arranged as a linear element. The second lighting unit is used for generating a second light source arranged as a punctual array. The light guide unit is disposed in the containing space and is used for providing the illumination lamp to generate a homogeneous planar light source. The light guide unit further comprises an exit surface and a plurality of surface microstructures. The exit surface is used for outputting the planar light source. The plurality of surface microstructures, disposed on the light guide unit, is used for changing the process way of the light source.

Furthermore, the light adjustment unit is disposed at the exit surface of the light guide unit and is used for controlling a light intensity distribution of the planar light source. The reflection unit is used for reflecting the first light source and the second light source to the exit surface. The control unit generates a control signal for controlling the first lighting unit and the second lighting unit to generate a luminous flux distribution of the two light sources: Additionally, the first light source and the second light source change an angle of reflection according to the reflection unit, and selectively generate the light intensity distribution outside of the illumination lamp body according to the light adjustment unit.

The objective of the present invention will no doubt become obvious to those of ordinary skill in the art after reading the following detailed description of the preferred embodiment, which is illustrated in following figures and drawings.

DETAILED DESCRIPTION OF THE INVENTION

The invention discloses a multi-function planar light source illumination lamp. Particularly, the first light source can be used alone to provide general illumination; the second light source can be used alone to provide adjustable mood illumination; or the first light source and the second light source can be used simultaneously to adjust optical intensity, color temperature and color gentleness of the general illumination. In order to make the description of the invention to be more detailed and complete, please refer to the following description and collocate with FIG. 1 to FIG. 4.

Figure 1:
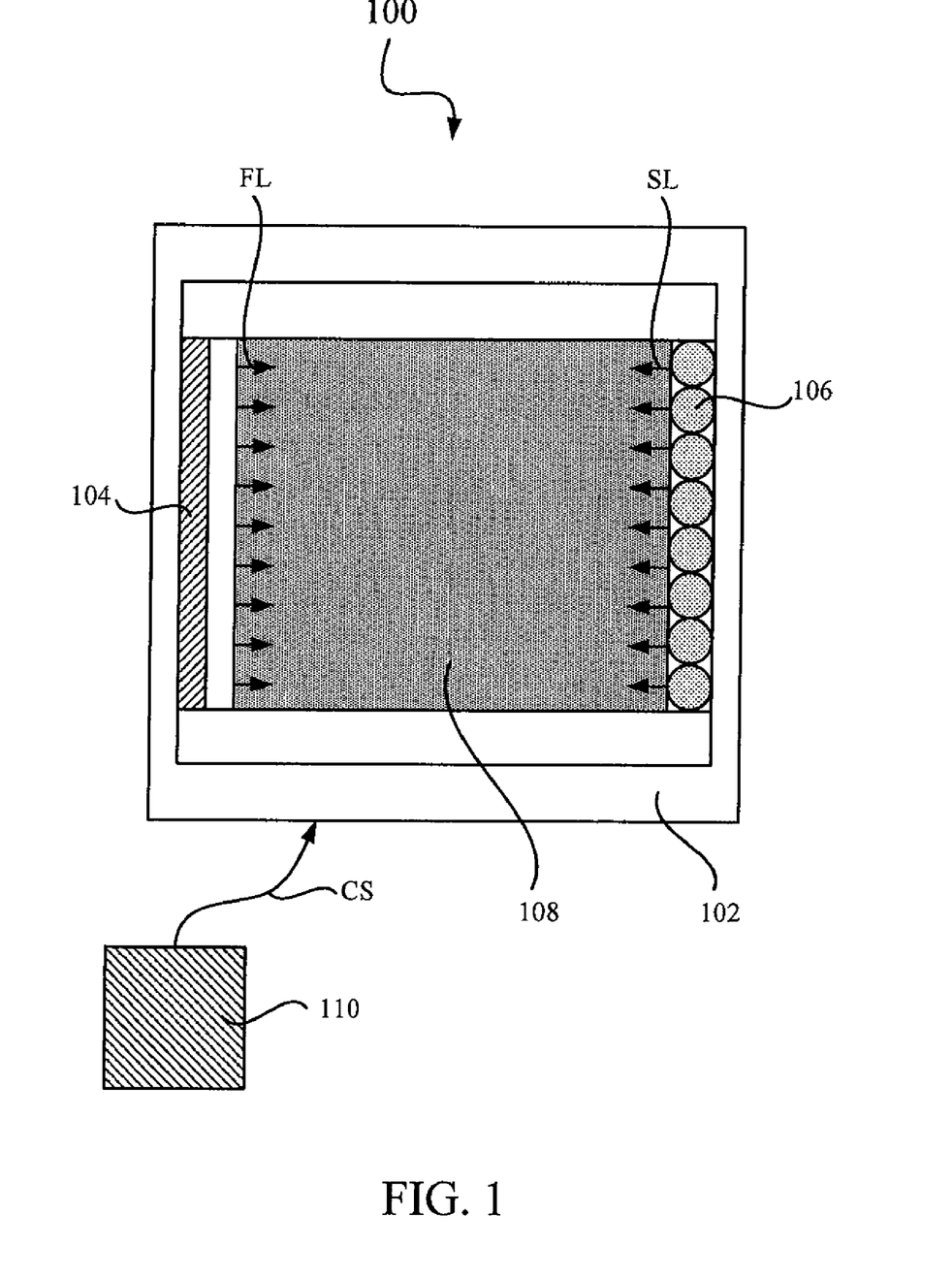
FIG. 1 is a top view illustrating an illumination lamp body according to an embodiment of the invention.

Please refer to FIG. 1. FIG. 1 is a top view illustrating an illumination lamp body 100 according to an embodiment of the invention. In the embodiment, the invention provides an illumination lamp body 100 having a containing space 102, which comprises a first lighting unit 104, a second lighting unit 106, a light guide unit 108 and a control unit 110.

The first lighting unit 104 is used for generating a first light source FL which is arranged as a linear element. For example, the first light source FL is a white light source. In practice, the first lighting unit 104 is a fluorescent tube, a daylight lamp, a cold cathode fluorescent tube, an organic illumination diode, an illumination diode or a combination of said units for generating the white light source. The second lighting unit 106 is used for generating a second light source SL which is arranged as a punctual array. For example, the second lighting unit 106 is a light emitting diode which generates at least three primary colors (red, blue and green).

The light guide unit 108, disposed in the containing space 102, provides the illumination lamp body 100 to generate a homogeneous planar light source SFL. For example, the planar light source SFL is a rectangle, an ellipse, a triangle or other optional geometry shape. The control unit 110 generates a control signal CS for controlling the first lighting unit 104 and the second lighting unit 106 to generate a luminous flux of the first light source FL and the second light source SL.

Figure 2A:
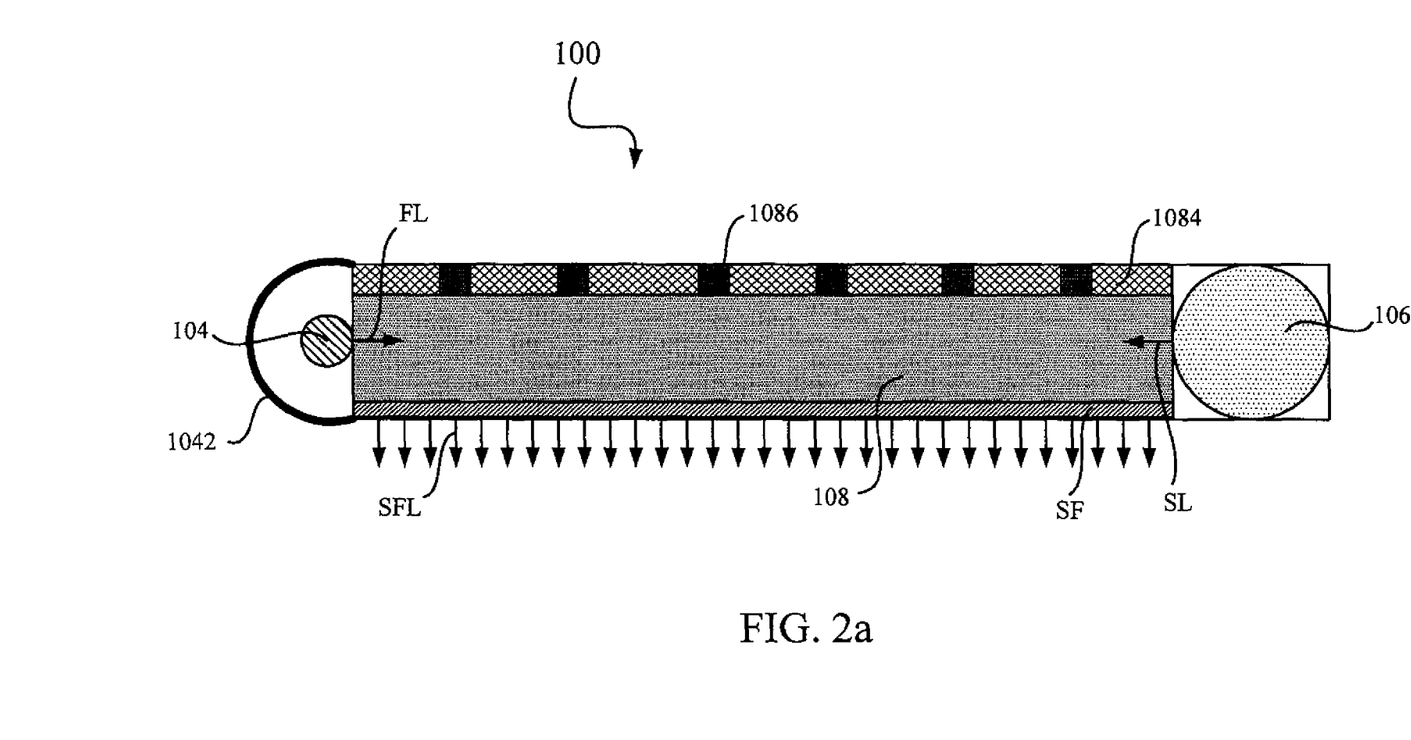
FIG. 2a is a side view illustrating the illumination lamp body of FIG. 1.

Moreover, the light guide unit 108 further comprises an exit surface SF, a reflective layer 1084 and a plurality of reflective structures 1086, as shown in FIG. 2a. The exit surface SF outputs the planar light source SFL. The plurality of surface microstructures 1086, disposed in the reflective layer 1084, is used for reflecting the first light source FL and the second light source SL to the exit surface SF. Additionally, the first light source FL and the second light source SL change an angle of reflection according to the plurality of reflective structures 1086, and selectively generate a light intensity distribution outside of the illumination lamp body 100 according to the light guide unit 108. The planar light source SFL and the exit surface SF of FIG. 2a have an included angle of 90°. However, the included angle of FIG. 2a is only used for an example, but not to limit the included angle of the planar light source and the exit surface of the invention.

Moreover, the first lighting unit 104 of FIG. 2a further comprises a reflective mirror 1042, disposed at one side of the first lighting unit 104, for reflecting the first light source FL to the other side of the first lighting unit 104, i.e., reflecting the first light source FL to the light guide unit 108. Additionally, the light guide unit 108 further comprises a reflective membrane (not shown in the figure) disposed in the reflective layer 1084, for increasing the reflection of the first light source FL and the second light source SL to the exit surface SF.

Furthermore, the first lighting unit 104 is controlled to output the luminous flux of the first light source FL of the planar light source SFL according to the control signal CS. The second lighting unit 106 is controlled to output a luminous flux proportion distribution of the second light source SL of the planar light source SFL according to the control signal CS.

Besides, the control signal CS comprises a light mixing proportion signal and a timing control signal. The light mixing proportion signal can be changed to different control signals CS (for example, current) to make the light emitting diode to generate different luminous flux, chroma or brightness. The timing control signal is provided to each light emitting diode respectively in a time slot of one fixed cycle or different cycles. For example, a current of 10 ms is provided continuously to the red LED of the three primary colors LEDs, a current of 5 ms is provided continuously to the green LED and a current of 2 ms is provided continuously to the blue LED will cause different luminous flux, chroma or brightness.

Additionally, the first lighting unit 104 and the second lighting unit 106 provide combinations of different color temperatures and colors according to the control signal CS.

Figure 2B:
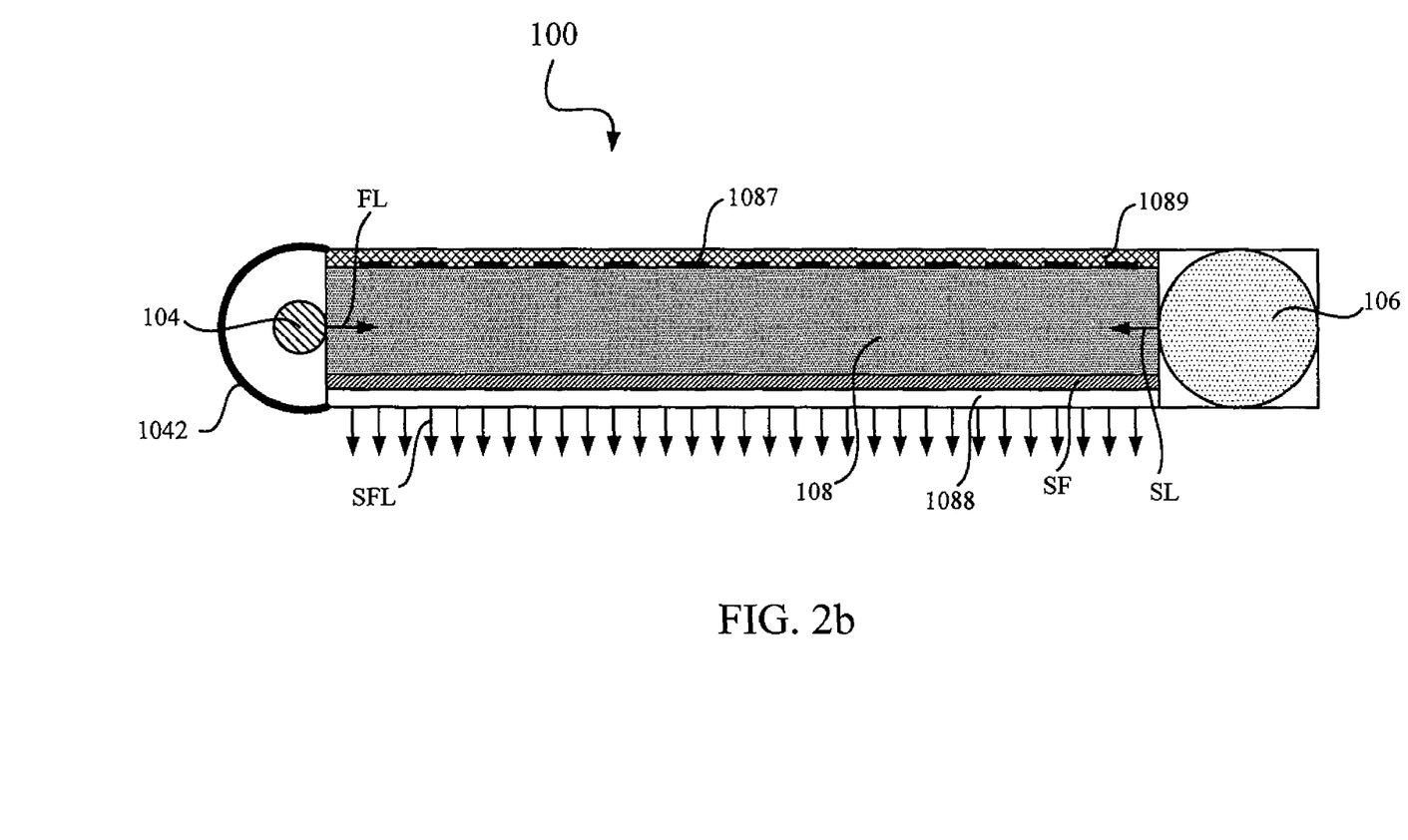
FIG. 2b is a side view illustrating an illumination lamp body according to another embodiment of the invention.

Please refer to FIG. 2b. FIG. 2b is a side view illustrating an illumination lamp body 100 according to another embodiment of the invention. As shown in FIG. 2b, the light guide unit 108 comprises a plurality of surface microstructure 1087 and collocates with the reflection unit 1089, which is used for reflecting the first light source FL and the second light source SL to the exit surface SF. There is an optical structured array (not shown) between the light guide unit 108 and the second lighting unit 106, whose structure also provides the second lighting unit 106 to guide the second light source SL into the light guide unit 108 completely.

Moreover, the illumination lamp body 100 further comprises a light adjustment unit 1088, disposed at one side of the light guide unit 108, for changing the planar light source SFL. For example, the light adjustment unit 1088 is a spotlight membrane, a diffusion membrane, a spotlight diffusion membrane or a combination thereof. In the embodiment, the light adjustment unit 1088 is disposed at one side of the exit surface SF. However, it is well known that the light adjustment unit 1088 can be disposed at any place of the illumination lamp body and then makes the planar light source SFL to be changed.

Please refer to FIG. 3a to FIG. 3e. FIG. 3a to FIG. 3e are schematic diagrams illustrating an illumination lamp body according to another embodiment of the invention.

Figure 3A:
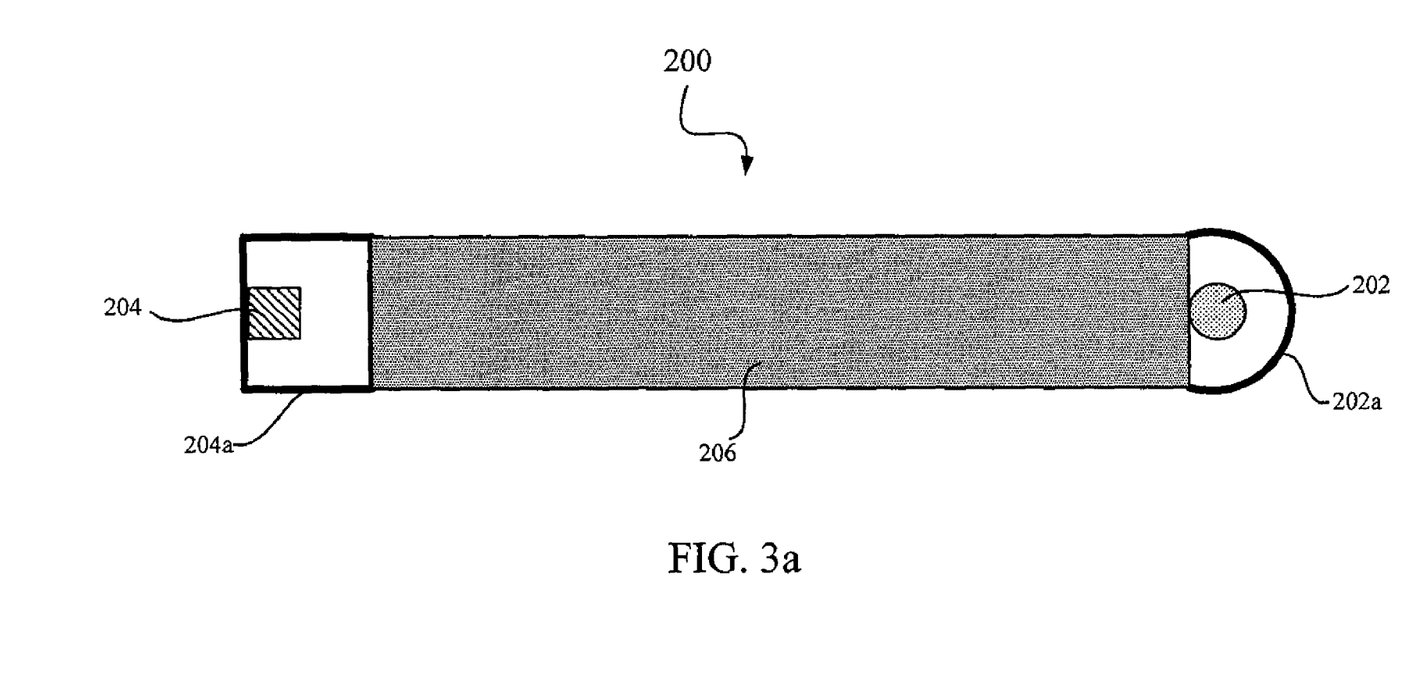
FIG. 3a to FIG. 3e are schematic diagrams illustrating an illumination lamp body according to another embodiment of the invention.

FIG. 3a illustrates a lamp body 200 having a first lighting unit 202 and a second lighting unit 204 disposed at both sides of a light guide unit 206 respectively, and a first reflection unit 202a and a second reflection unit 204a are corresponded to the first lighting unit 202 and the second lighting unit 204 respectively.

Figure 3B:
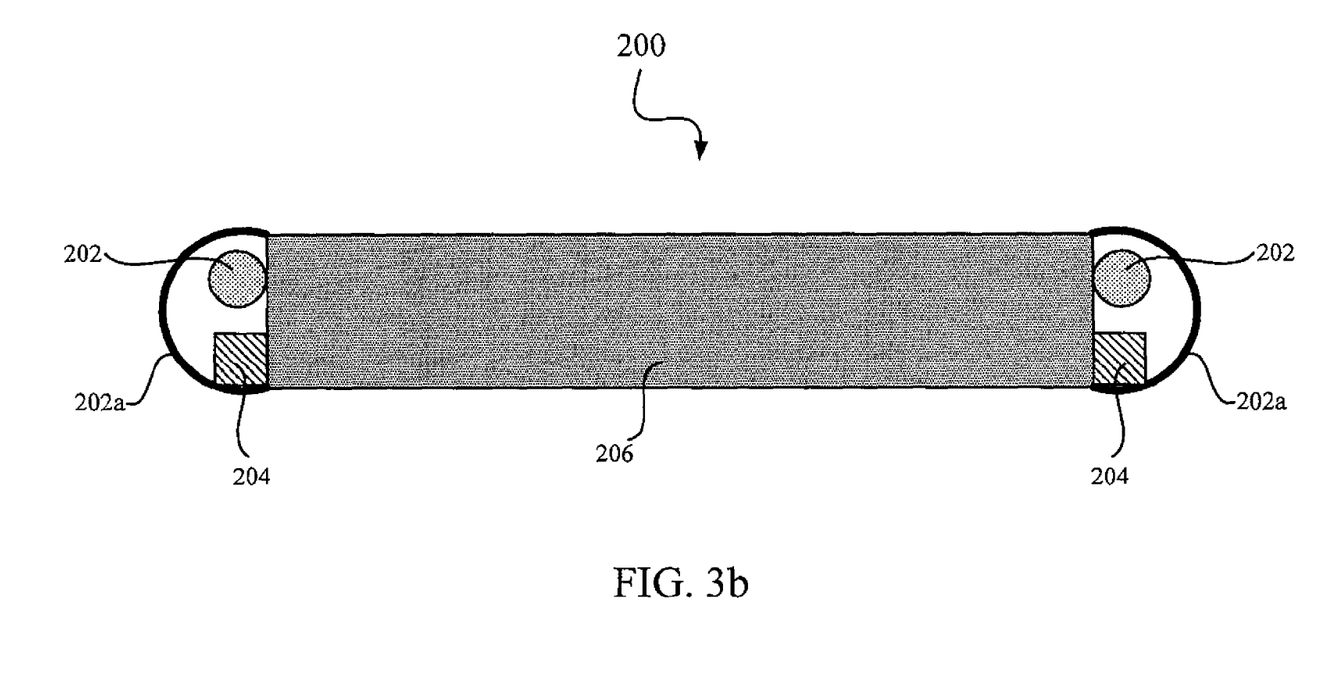

FIG. 3b illustrates a lamp body 200 having a first lighting unit 202 and a second lighting unit 204 which are disposed at the same side of a light guide unit 206, and a first reflection unit 202a is shared by the first lighting unit 202 and the second lighting unit 204.

Figure 3C:
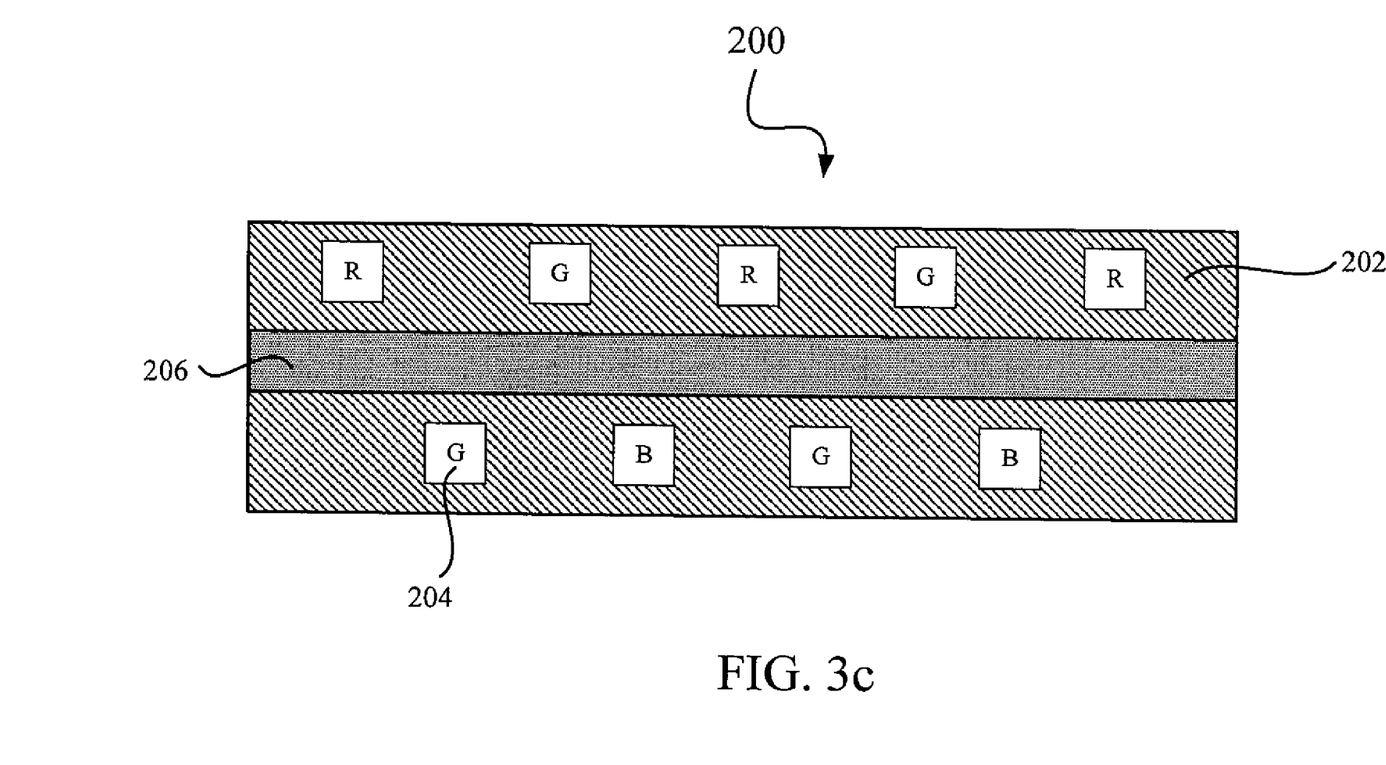

FIG. 3c illustrates a lamp body 200 whose first lighting unit 202 and second lighting unit 204 are disposed on a light guide unit 206, wherein the second lighting unit 204 are light emitting diodes (LED) having special arrangement. For example, the LEDs of red-LED (R) and green-LED (G) or green-LED (G) and blue-LED (B) shown in FIG. 3c are mutually staggered arrangement. However, the light emitting diodes can be arranged optionally without limitation to this example.

Figure 3D:
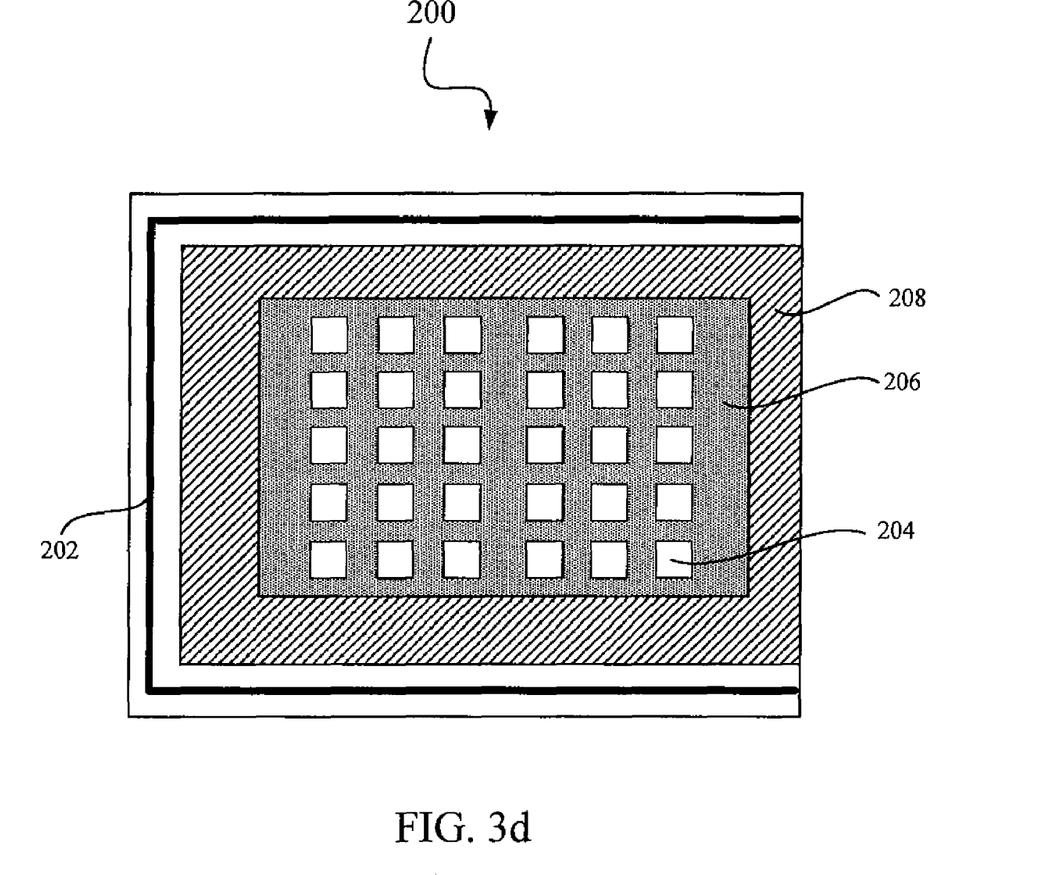

FIG. 3d illustrates a lamp body 200 whose second lighting unit 204 is disposed on a light guide unit 206. The edge of the second lighting unit 204 is surrounded by the first lighting unit 202. A reflective layer 208 is used to reflect a first light source and a second light source, and the two light sources are provided to said illumination lamp body 100 of FIG. 1. It's better for the first lighting unit 202 to present a linear ring type. However, the type of the first lighting unit 202 of the invention is not limited to this example.

Figure 3E:
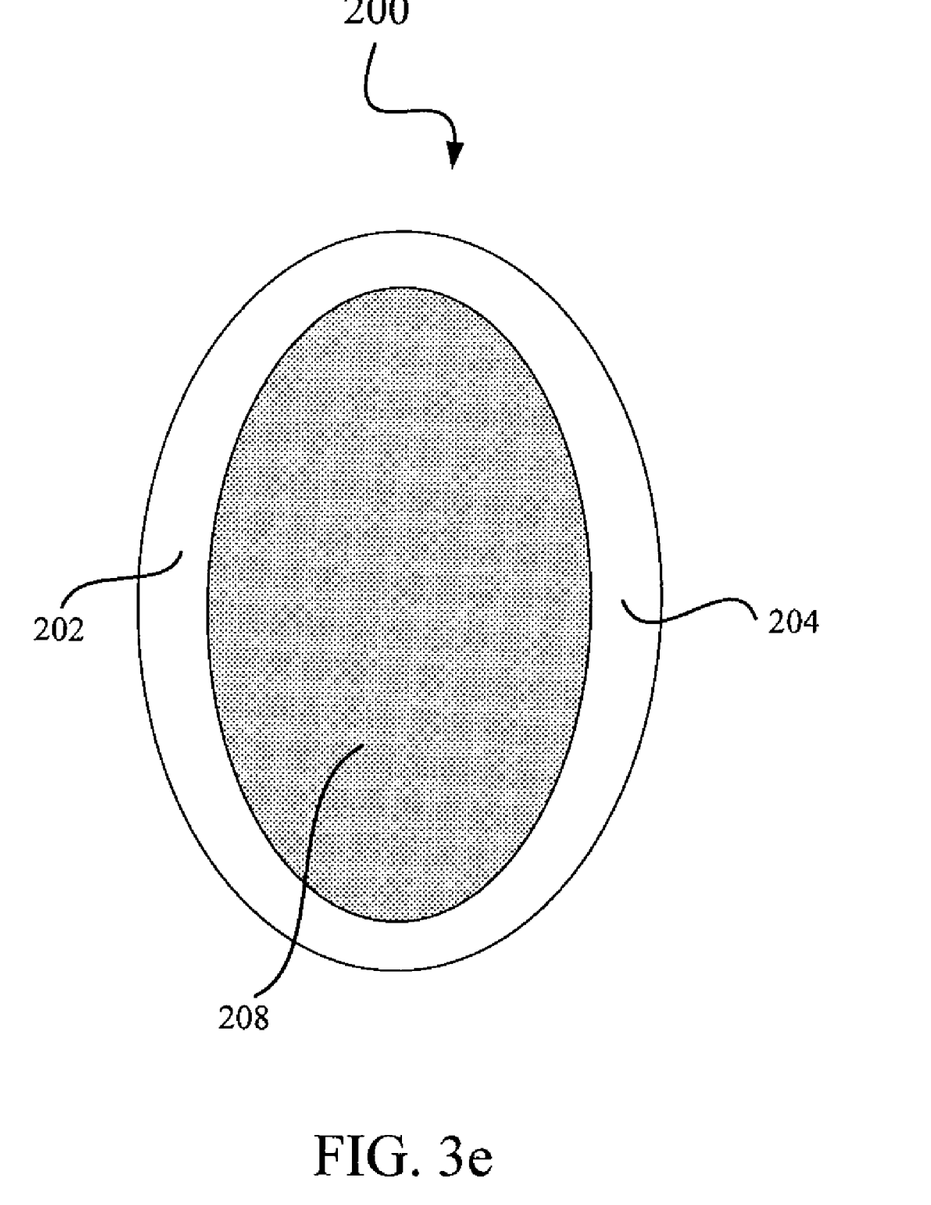

FIG. 3e illustrates a lamp body 200 having an elliptic planar light source 210 which comprises a first lighting unit 202 and a second lighting unit 204. A reflective layer 208 is used to reflect a first light source and a second light source, and the two light sources are provided to said illumination lamp body 100 of FIG. 1.

Figure 4:
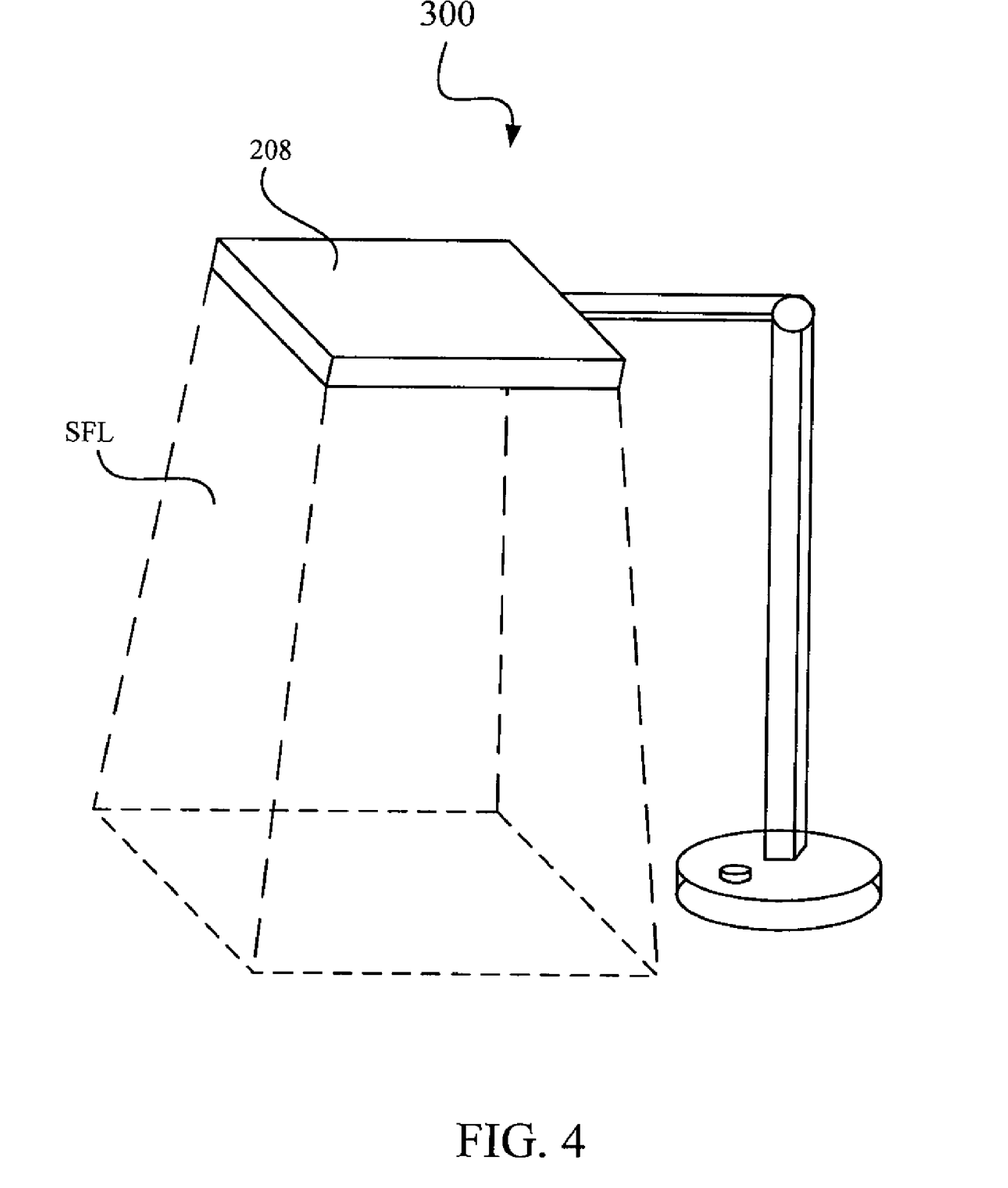
FIG. 4 is a schematic diagram illustrating the illumination lamp body of the invention applied to a consuming product.

Please refer to FIG. 4. FIG. 4 is a schematic diagram illustrating the illumination lamp body 300 of the invention applied to a consuming product. In this embodiment, the consuming product is a table lamp which comprises a lamp body 300 having a first light source and a second light source (not shown in the figure). Additionally, the first light source can be individually used for general illumination. The second light source can be used to provide adjustable mood illumination. Also, the first light source and the second light source are used simultaneously to make the outputting light source to be a planar light source SFL, so as to achieve the purpose of adjusting optical intensity, color temperature and color gentleness of the general illumination.

With the examples and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A multi-function planar light source illumination lamp having a containing space, the multi-function planar light source illumination lamp comprising:
    a first lighting unit for generating a first light source arranged as a linear element;
    a second lighting unit for generating a second light source arranged as a punctual array;
    a light guide unit, disposed in the containing space, for providing the multi-function planar light source illumination lamp to generate a homogeneous planar light source, the light guide unit comprising:
        at least an exit surface for outputting the planar light source;
        a reflective layer; and
        a plurality of reflective structures, disposed in the reflective layer, for reflecting the first light source and the second light source to the exit surface; and
    a control unit generating a control signal for controlling the first lighting unit and the second lighting unit to generate a luminous flux of the first light source and the second light source;
    wherein the first light source and the second light source change an angle of reflection according to the plurality of reflective structures, and selectively generate a light intensity distribution outside of the illumination lamp according to the light guide unit.

2. The multi-function planar light source illumination lamp of claim 1, wherein the first light source is a white light source, further comprising a reflective mirror disposed at one side of the first lighting unit, for reflecting the first light source to the other side of the first lighting unit.

3. The multi-function planar light source illumination lamp of claim 2, wherein the first lighting unit is a fluorescent tube, a daylight lamp, a cold cathode fluorescent tube, an organic illumination diode, an illumination diode or a combination of said units for generating the white light source.

4. The multi-function planar light source illumination lamp of claim 1, wherein the second lighting unit is a light emitting diode (LED) which generates at least three primary colors.

5. The multi-function planar light source illumination lamp of claim 1, wherein the first lighting unit is controlled to output the luminous flux of the first light source of the planar light source according to the control signal.

6. The multi-function planar light source illumination lamp of claim 1, wherein the second lighting unit is controlled to output a luminous flux proportion distribution of the second light source of the planar light source according to the control signal.

7. The multi-function planar light source illumination lamp of claim 1, wherein the first lighting unit and the second lighting unit provide combinations of different color temperatures and colors according to the control signal.

8. The multi-function planar light source illumination lamp of claim 1, wherein the plurality of reflective structures comprise at least an optical microstructure.

9. The multi-function planar light source illumination lamp of claim 1 further comprising a light adjustment unit, disposed on the exit surface of the light guide unit, for controlling the optical intensity distribution.

10. The multi-function planar light source illumination lamp of claim 1, wherein the planar light source is a rectangle, an ellipse, a triangle or other optional geometry shape.

11. An illumination lamp body having a containing space, the illumination lamp body comprising:
    a first lighting unit for generating a first light source arranged as a linear element;
    a second lighting unit for generating a second light source arranged as a punctual array;
    a light guide unit, disposed in the containing space, for providing the illumination lamp body to generate a homogeneous planar light source, the light guide unit comprising:
        an exit surface for outputting the planar light source; and
        a plurality of surface microstructures, disposed on the surface of the light guide unit;
    a light adjustment unit, disposed at the exit surface of the light guide unit, for controlling a light intensity distribution of the planar light source;
    a reflection unit, for reflecting the first light source and the second light source; and
    a control unit generating a control signal for controlling the first lighting unit and the second lighting unit to generate a luminous flux distribution of the first light source and the second light source;
    wherein the first light source and the second light source change an angle of reflection according to the reflection unit, and selectively generate the light intensity distribution outside of the illumination lamp body according to the light adjustment unit.

12. The illumination lamp body of claim 11, wherein the reflection unit further comprises a plurality of surface microstructures for reflecting the first light source and the second light source to the at least one exit surface.

13. The illumination lamp body of claim 11, wherein the first light source is a white light source, further comprising a reflective mirror disposed at one side of the first lighting unit, for reflecting the first light source to the other side of the first lighting unit.

14. The illumination lamp body of claim 13, wherein the first lighting unit is a fluorescent tube, a daylight lamp, a cold cathode fluorescent tube, an organic illumination diode, an illumination diode or combination of said units for generating the white light source.

15. The illumination lamp body of claim 11, wherein the second lighting unit is a light emitting diode which generates at least three primary colors.

16. The illumination lamp body of claim 11, wherein the first lighting unit is controlled to output the luminous flux of the first light source of the planar light source according to the control signal.

17. The illumination lamp body of claim 11, wherein the second lighting unit is controlled to output a luminous flux proportion distribution of the second light source of the planar light source according to the control signal.

18. The illumination lamp body of claim 11, wherein the first lighting unit and the second lighting unit provide combinations of different color temperatures and colors according to the control signal.

19. The illumination lamp body of claim 11, wherein the plurality of surface microstructures comprise at least an optical microstructure.

20. The illumination lamp body of claim 11, wherein the planar light source is a rectangle, an ellipse, a triangle or other optional geometry shape.

* * * * *